Aug. 15, 1944.     H. T. KRAFT     2,355,871
TUBE CONNECTOR
Filed Aug. 26, 1942

INVENTOR
*Herman T. Kraft*
BY
*Evans & McCoy*
ATTORNEYS

Patented Aug. 15, 1944

2,355,871

UNITED STATES PATENT OFFICE 2,355,871

TUBE CONNECTOR

Herman T. Kraft, Akron, Ohio, assignor to The General Tire & Rubber Company, Akron, Ohio, a corporation of Ohio Application August 26, 1942, Serial No. 456,151

2 Claims. (Cl. 285—193)

This invention relates to a deformable connector for joining tube sections and particularly for use in the repair of pneumatic valve stems that have been injured in service, and to a convenient tool for use in applying such connectors.

Under conditions of modern warfare, much difficulty has been experienced by the armed forces in damage to and the breaking off of tire valve stems on trucks and the like. The damage to the valve stems generally occurs near the outer end thereof, and many times the valve stems are either completely broken off or cracked while in service. The present invention is intended to meet this need by providing an improved form of connector and a tool for use in the field. The connector and tool also may be used for repairing other tubing.

The objects of the present invention include the provision of a new and improved connector and tool for repairing damaged, broken or faulty tubes, such as valve stems and the like, quickly and simply and usually without the removal of the tire from the wheel.

With the above and other objects in view which will be apparent to those who are familiar with the uses and problems of repairing metal tubes or in maintaining pneumatic tires in serviceable condition under wartime demands, an illustrative embodiment of the present invention is disclosed in the accompanying drawing, wherein.

Figure 1:
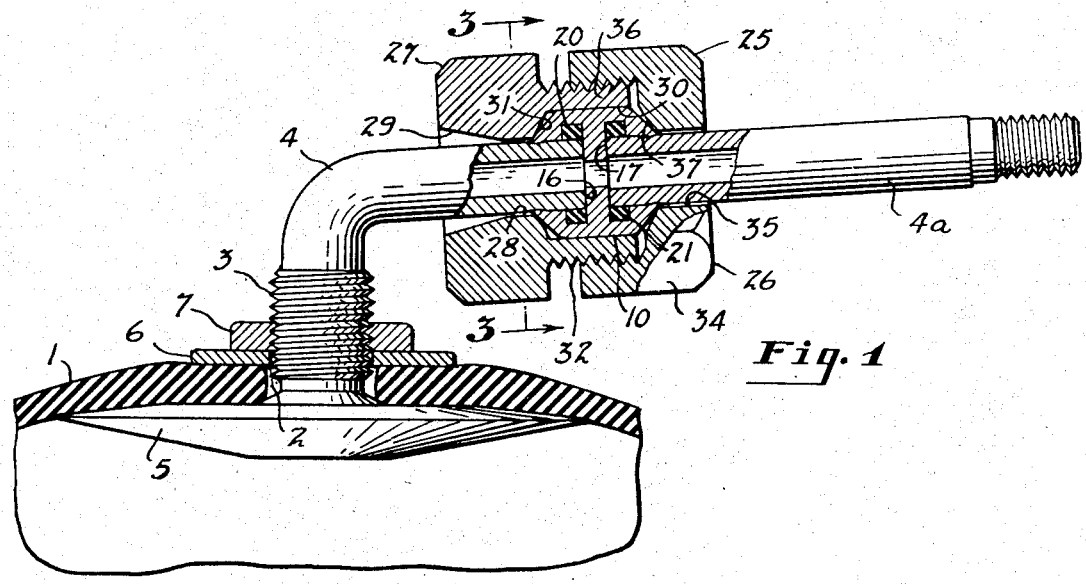
Figure 1 is an elevational view of a valve stem in the process of being repaired, and showing the coupling tool and valve stem, with parts broken away and shown in section to better illustrate a preferred embodiment of the invention.

Referring particularly to Fig. 1 of the drawing, a pneumatic tire inner tube 1 has an aperture 2 in which an externally threaded portion 3 of a conventional metal valve stem 4 is secured by a cemented-on valve base 5, positioned inside of the tube, and a washer 6 and internally threaded nut 7 that is threaded on the stem and is turned down tightly against the washer 6 to provide an airtight union between the tube and the stem. This construction is illustrative of any common mounting of a valve stem on an inner tube or other inflatable member.

Figure 2:
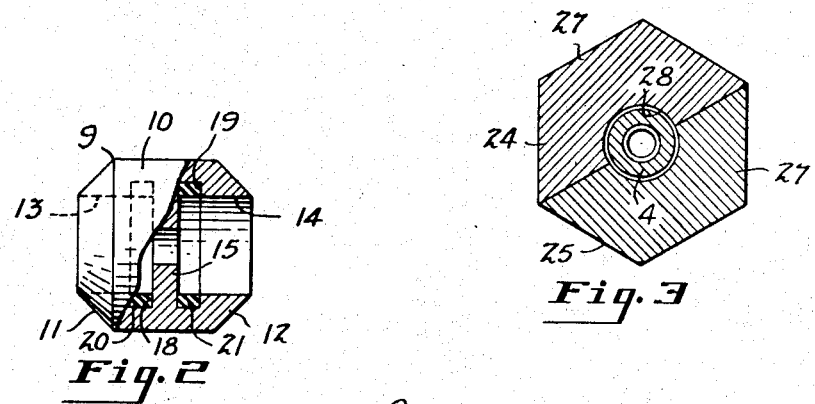
Fig. 2 is an enlarged elevational view, partly broken away and in section, of the coupling shown in Fig. 1.

The repair coupling 9, as separately illustrated in Fig. 2, is formed of a malleable material, such as brass or the like, and comprises a body portion that has a substantially cylindrical outside surface 10 over the middle portion thereof and is tapered at its opposite ends in substantially conical faces 11 and 12. The conical faces 11 and 12 are preferably inclined at an angle of approximately 45 degrees with respect to the axis of the coupling. The coupling has concentric cylindrical bores 13 and 14 from each end and of the proper size to receive and closely fit the ends of the tubes to be joined. These bores 13 and 14 are dimensioned to make a close working fit on the free end of the stem parts 4 and 4a in order that these parts may have adequate mechanical strength when joined together. An apertured partition 15 is disposed midway between the ends of the coupling to provide locating faces against which the opposed ends 16 and 17 of the metal tube parts to be joined, 4 and 4a, may seat. The partition 15 may be a ring pressed fit or sweated into place if preferred.

The coupling also has gasket housing grooves 18 and 19 that are disposed on opposite sides of the partition 15 and serve to house gaskets 20 and 21 therein that are made of a suitable compressible air sealing material, such as a gasoline-resistant synthetic rubber or the like.

Figure 3:
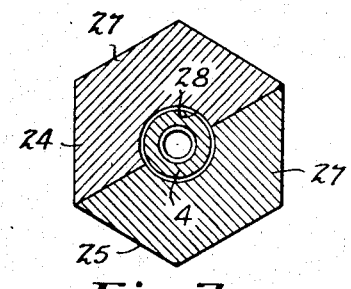
Fig. 3 is a section taken along the line 3—3 of Fig. 1 of the male member of the tool.
Figure 4:
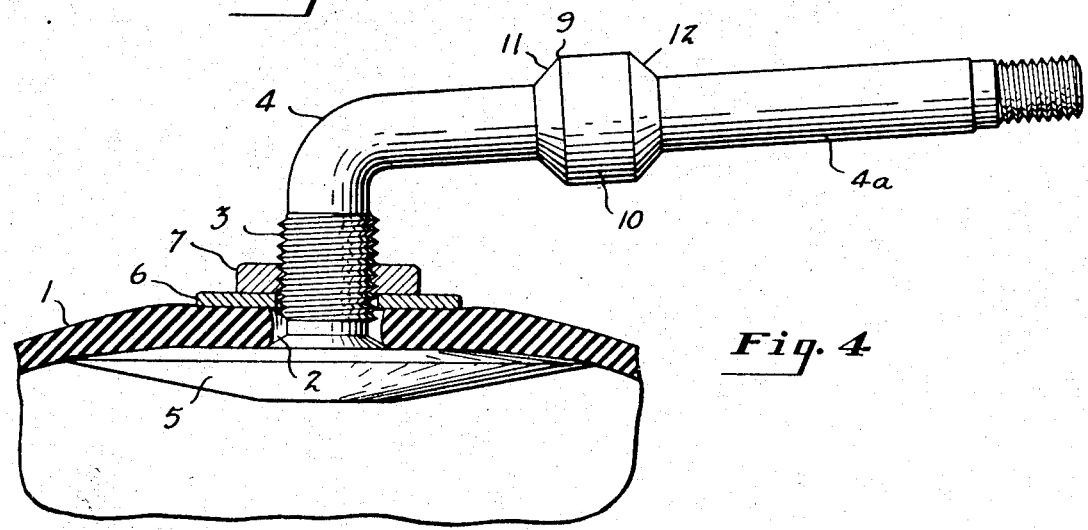
Fig. 4 is an elevational view of the repaired stem shown in Fig. 1, ready for use.

The coupling is secured to the ends of the valve stem portions 4 and 4a by a tool 23 which comprises a male member formed of two halves 24 and 25 which make threaded engagement with a female member 26 to swage the coupling against the parts of valve stem to secure these valve stem parts together with an airtight seal at the connection. This tool is shown in Figs. 1 and 3.

The two mated halves 24 and 25 of the male clamping member have wrench-engaging faces 27 formed thereon. The male clamping member preferably is made from a hexagonal section that is first cut longitudinally from corner to corner along the axis of the member to separate it longitudinally into two equal halves. These halves are then clamped together and drilled to provide a bore 28, a conical bore 29, a counterbore 30 and a clamping seat 31. A cylindrical portion 32 of the male member is then threaded on its outer face while the parts are clamped together in order to make threaded engagement with the internally threaded female member.

The bore 28 is of proper size to receive the valve stem 4 and preferably is enlarged axially into the conical bore 29 at its outer end to permit some tilting action of the male clamping member on the tube or to accommodate a bent tube during the operation of securing the coupling in place. The counterbore 30 is then formed axially of the member to make a close working fit with the cylindrical surface 10 of the coupling. Between the bores 28 and 30 the mated male clamping member has the conically tapered clamping seat 31 that preferably is of somewhat greater angularity relative to the axis of the parts connected than the angularity of the conical end faces 11 and 12 of the coupling, in order to impose a substantially axially directed pressure against the conical tip portions of the coupling in order to force these end portions into the tube wall.

The female member 26 has wrench-engaging faces 34 and a bore 35 of substantially the same size as the valve stem or tube section to be joined to the coupling by it. The female member 26 also has a conical tapered clamping seat 37 between the bore 35 and an internally threaded part 36. The angularity of the seat 37 with respect to the axis of the female member 26 preferably is the same as the angularity of the tapered seat 31 of the male member.

To repair a broken valve stem or connect tube ends, both parts of the injured metal tube or valve stem 4 and 4a first are cut through with a hand saw to remove the damaged part of the stem and provide square seating faces 16 and 17 that are normal to the axis of the stem or tubing. A new valve stem repair portion 4a, or, if the original stem was merely broken, the outer end 4a of the original stem and the stem base 4 are inserted into the opposite ends of the coupling after the rubber gaskets 20 and 21 have been fitted into place in the grooves 18 and 19 of the coupling. In this position the squared ends 16 and 17 of the valve stem parts seat against the partition 15 of the coupling to locate the tube ends and to provide support against bending.

The parts 24 and 25 of the male clamping member are then placed together over the coupling with the tube 4 in place and the female member 26 is passed over the outer end of the stem portion 4a and threaded onto the male member. The male member is then clamped in a vice or held in any other suitable manner across the wrench-engaging faces 27 parallel with the plane of separation of the parts thereof to hold the male member securely while the female member 26 is wrenched into place to apply heavy clamping pressure at the opposite tip ends of the repair unit. This forces the conical end portions of the repair unit into the walls of the valve stem portions 4 and 4a and tends also to compress the gaskets 20 and 21 and to somewhat flare the ends of the valve stem that seat against the partition 15 of the coupling. The female member is pulled up tightly on the threads of the male member until a sufficiently rigid joint for normal operation of the tube or stem is produced. The tool is then removed from the applied coupling.

The advantages of this particular character of device for use by mechanics in the field where trucks and the like are serviced, or for use in military work are of great importance for making quick and dependable repairs of valve stems and similar equipment. The clamping members are preferably made of hard steel that will impose a very substantial pressure against the coupling ends.

By clamping or swaging the ends of the coupling into the walls of the tubing and also forcing the tube ends against the opposed faces of the coupling, a very strong and dependable repair or tube connection is obtained. The gasket material carried in the grooves 18 and 19 of the coupling is of sufficient volume to insure a close sealing fit with the ends of the tubes. The bending inwardly of the coupling ends or the longitudinal shortening of the coupling compresses this material against the tube ends and assists in mechanically strengthening the repair. By supporting the inner tube ends against the partition, and compressing the gasket material around them and also clamping the tube at the outer ends of the coupling where the coupling metal is forced somewhat into the walls of the tube, provides a strong and dependable field repair or tube coupling of great utility.

It is to be understood that the particular designing of the coupling and clamping tool and their application to the repair of a valve stem or other tube, have been shown and described for the purposes of illustrating and describing a preferred embodiment of the invention and that various changes, modifications and adaptations may be made in the coupling and clamping tool and in the uses to which they may be put, without departing from the invention that is defined by the appended claims.

What I claim is:

1. A repair coupling comprising a one piece malleable metal sleeve having end portions adapted to closely fit upon the ends of the tubes to be joined and a central apertured partition providing an abutment for the tube ends, said sleeve having an internal circumferential gasket receiving groove at each side of said partition, the ends of said sleeve being tapered conically to facilitate the swaging of the sleeve ends upon the tubes by pressure applied axially to the tapered ends, and annular gaskets mounted in said grooves with their internal faces substantially flush with internal tube receiving faces at the ends of said sleeve.

2. In combination a repair coupling comprising a one piece malleable metal sleeve having a central apertured partition, conically tapered ends and internal gasket receiving grooves, one at each side of said partition, an annular gasket in each of said grooves, and tubes fitting in the ends of said sleeve with their ends abutting said partition, the ends of said sleeve being shrunk upon said tubes and upset against said gaskets to provide a fluid tight connection between the tubes.

HERMAN T. KRAFT.